United States Patent Office 3,375,740
Patented Apr. 2, 1968

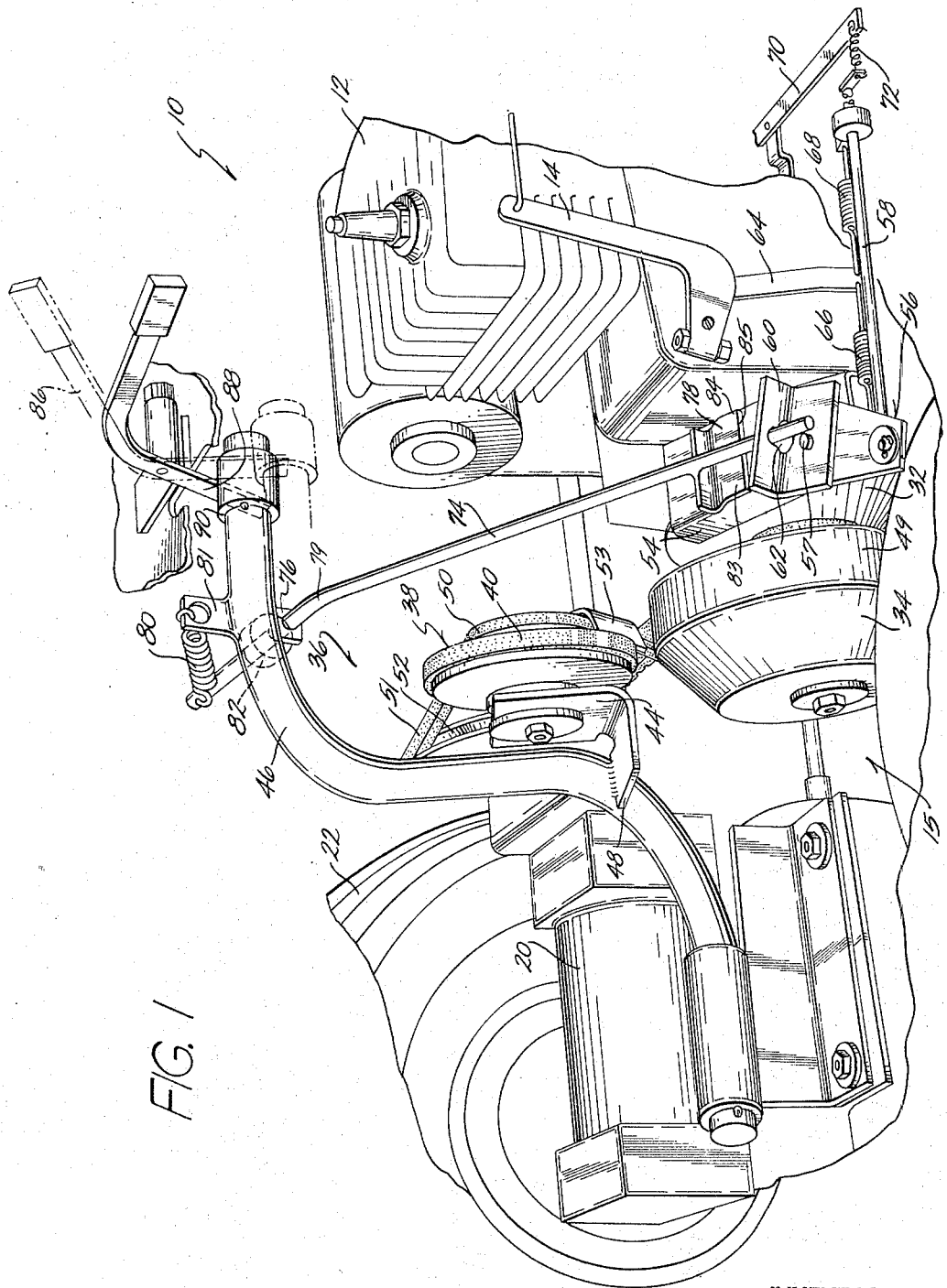

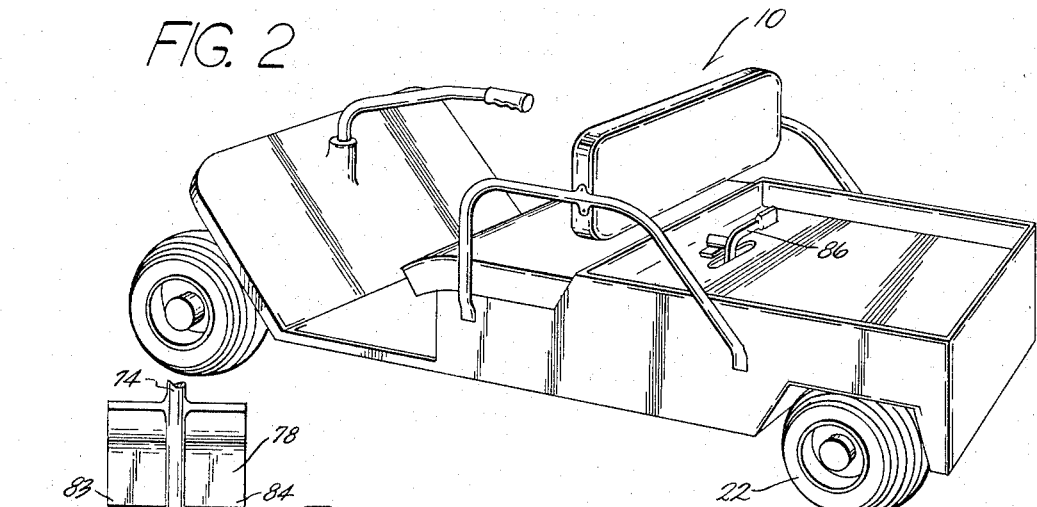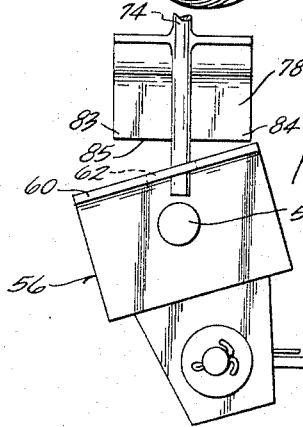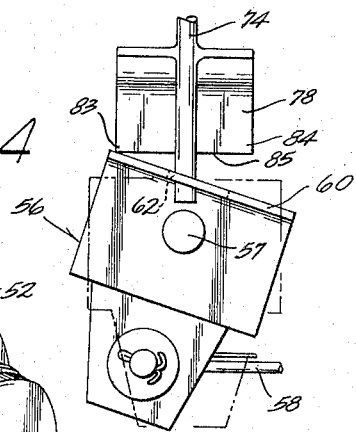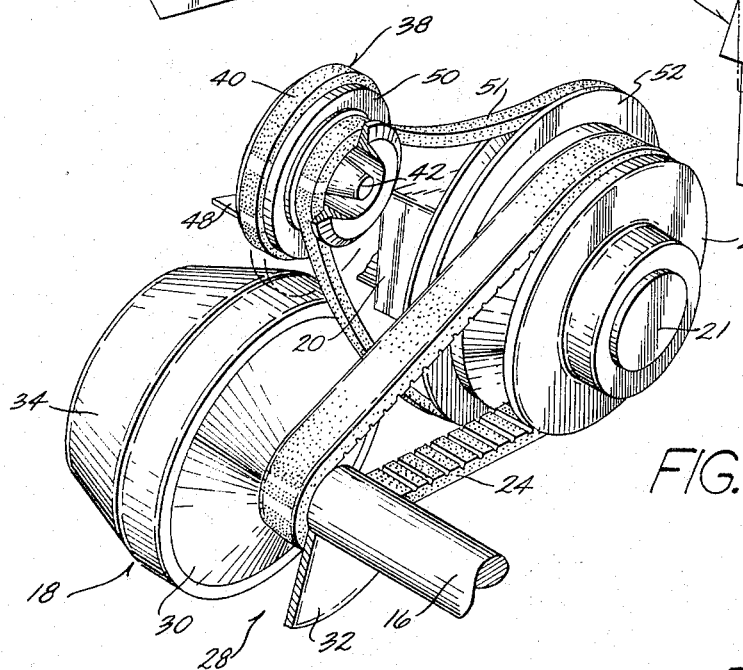
INVENTOR
ROBERT O. BOTTUM
BY
Wheeler, Wheeler & Wheeler
ATTORNEYS

3,375,740
REVERSE MECHANISM AND THROTTLE CONTROL
Robert O. Bottum, Lincoln, Nebr., assignor to Outboard Marine Corporation, Waukegan, Ill., a corporation of Delaware
Filed Aug. 25, 1965, Ser. No. 482,562
19 Claims. (Cl. 74—872)

ABSTRACT OF THE DISCLOSURE

Disclosed herein is a vehicle and engine with a drive train including a centrifugal clutch with a clutch housing secured to the engine drive shaft. The clutch has a pulley which is connected to a pulley on the rear wheel differential by a belt. The drive train has a reversing mechanism which includes a rubber drive wheel rotatably mounted on a shaft carried by a movable bracket. The rubber drive wheel has a sheave or pulley secured thereto which is connected to a second pulley on the shaft of the rear wheel differential by a belt. Movement of the rubber drive wheel into engagement with the clutch housing by movement of an actuator arm also tightens the belt connecting the rubber wheel to the differential and thus reverses the direction of rotation of the differential shaft. The engine also includes an arrangement for automatically controlling engine speed during operation of the vehicle in reverse drive. The arrangement includes a linkage which is connected to the rod which actuates the reversing mechanism.

---

This invention relates to vehicles, and more particularly to reverse drive arrangements for vehicles.

The invention provides for a vehicle having a simple, efficient, and economical reversing mechanism which is selectively engageable with a member driven by an engine. The reversing mechanism is operatively connectable to a driven member during engagement of the reversing mechanism with the driving member. Provision is made for automatically controlling the engine speed during operation of the reversing mechanism.

More specifically, in the preferred embodiment of the invention, there is provided a vehicle having an engine and a drive train including a centrifugal clutch affording a forward drive condition upon rotation of the engine above a predetermined speed. The centrifugal clutch includes a member driven by the engine. The reversing mechanism is provided with a rotatable member and is arranged for movement to a position affording frictional engagement of the rotatable member with the clutch member. Generally concurrent with the engagement of the rotatable member with the clutch member, a belt trained around respective pulleys on the rotatable member and on the drive train is tightened to afford reverse driving connection of the drive train with the rotatable member.

Generally concurrent with the operation of the reversing mechanism, the engine throttle is automatically moved to a predetermined position affording an engine speed which is below that necessary to operate the centrifugal clutch. This occurs regardless of the throttle setting at the time of operation of the reversing mechanism. While various clutch arrangements can be used, use of a centrifugal clutch is preferred in order to obtain automatic declutching of the engine from the drive train in response to engine speed reduction.

To prevent centrifugal clutch engagement while in reverse condition, provision is made for maintaining the throttle in said predetermined position throughout operation in reverse drive condition. Also, provision is made for biasing the reversing mechanism out of engagement with the clutch member to afford automatic disengagement of the reversing mechanism upon removal of the motive force affording reverse mechanism engagement.

Other objects, advantages, and features of this invention will become apparent from the following description and accompanying drawings in which:

FIGURE 1 is a fragmentary perspective view of a vehicle embodying various of the features of the invention;

FIGURE 2 is a perspective view of a vehicle embodying the device shown in FIGURE 1;

FIGURE 3 is an enlarged perspective view of a portion of the vehicle shown in FIGURE 1;

FIGURE 4 is an enlarged fragmentary plan view of another portion of the vehicle shown in FIGURE 1; and FIGURE 5 is a view similar to FIGURE 4 showing the device of FIGURE 4 in a different position.

Referring now to the drawings, and more particularly to FIGURE 1, a vehicle 10 is generally provided with an engine 12 having a throttle 14 for controlling engine speed. The engine 12 is operatively connected to a drive train 15 to afford a forward drive condition. The drive train 15 generally includes a driving member or drive shaft 16 (shown best in FIGURE 3), a clutch 18 carried on the drive shaft 16, and a differential 20 operatively connected to the clutch 18 and through a driven member 21 to a wheel 22.

The clutch 18 is connected to the differential 20 by means of a drive belt 24 trained about a pulley 26 operatively connected to the differential member 21 and a pulley 28 on the drive shaft 16. The pulley 28 is formed, in part, by a part of the clutch 18 which is preferably a centrifugal clutch although other clutches can be used. Any suitable centrifugal clutch can be employed. The pulley 28 comprises a pair of sheaves 30 and 32 between which the belt 24 is carried. One of the sheaves, namely sheave 30, is a component of the centrifugal clutch 18. The other sheave 32 is arranged to rotate with the drive shaft 16. The centrifugal clutch 18 is arranged for driving connection of the engine 12 with the drive train 15 upon engagement of the clutch 18 in response to engine operation above a predetermined speed.

The operation of the centrifugal clutch 18 is generally conventional and rotation of the engine above said predetermined speed affords driving connection of the pulley 28 with the belt 24 and ultimately with the differential 20 to afford a forward drive condition. The centrifugal clutch 18 is covered by a housing or casing 34 which is fixed on the driving member or drive shaft 16 for rotation therewith.

A reversing mechanism, generally identified by the numeral 36, is carried on the vehicle 10 and is arranged to afford selective engagement thereof with the driving member 16 and operative driving connection of the reversing mechanism 36 with the driven member 21 in response to engagement of the reversing mechanism 36 with the driving member 16 to afford a reverse drive condition of the vehicle 10.

More particularly, the reversing mechanism 36 is arranged to be actuated by an arm 46 pivotally carried by the vehicle, and includes a rotatable member, rotor, or drive wheel 38 which is selectively engageable with the clutch housing 34. The rotatable member 38 includes a rubber ring 40 on the periphery thereof to afford frictional driving engagement of the rotor 38 with an annular portion 49 of the housing 34. The rubber drive wheel 38 is rotatably mounted on a shaft 42 (see FIGURE 3) which, in turn, is carried on a swingable bracket 44. The swingable bracket 44 includes an out-turned flange 48 and can be pivotally mounted in any suitable manner to a portion of the vehicle, such as the frame, for engagement by a portion of the actuator arm to afford swinging movement of the bracket 44 to engage the drive wheel 38 with the clutch housing 34. Alternatively, the bracket 44 can be mounted to the actuator arm 46 by welding of the flange 48 to the arm, whereby the bracket 44 partakes of the pivotal movement of the arm 46.

Means are provided for affording driving connection of the rotatable member or rotor 38 with the driven member 21 of the differential 20 during, and in response, to, engagement of the rotatable member 38 with the driving member 16 to afford a reverse drive condition. In the illustrated embodiment, said means comprises a pulley 50 (see FIGURE 3) carried on the shaft 42 and generally attached to, or made as a part of, the rubber rotor 38 for rotation of the pulley 50 with the rubber rotor 38. Said means further includes a transmission belt 51 loosely trained around or carried on the reversing mechanism pulley 50 and on a second pulley 52 carried on the driven member 21 of the differential 20. A belt retaining bracket 53 assists in retaining the belt 51 on pulleys 50 and 52 when loosely trained thereon. Upon actuation of the reversing mechanism 36, as by moving the rubber rotor 38 into engagement with the clutch housing 34 (as shown by phantom lines in FIGURE 3) the transmission belt 51 is tightened or tensioned around the pulleys 50 and 52 to afford operative driving connection of the reversing mechanism 36 with the drive train 15 of the vehicle 10. The driving connection can occur prior to, simultaneous with, or during engagement of the rotor 38 with the housing 34.

The engine 12 is provided with a throttle or link 58, together with a first means for controlling the throttle or engine speed in the form of an accelerator pedal (not shown) and a connected lever arm 70. More specifically, one end of the lever arm 70 cooperates with the accelerator pedal and the other end of the arm 70 is connected to the link 58 through a lost motion spring 72.

Also provided are means operable independently of said first means for controlling engine speed and in response to the operation of said reversing mechanism for over-riding said first means for controlling engine speed to automatically control engine speed during operation of the vehicle 10 in reverse drive condition. The aforementioned means is operable in response to the operation of the reversing mechanism 36 to adjust the engine speed by moving the engine throttle 14 to a predetermined position providing an engine speed below that speed necessary for operation of the centrifugal clutch 18. The aforementioned means also is operable to hold the engine throttle 14 in said predetermined position during operation of the vehicle 10 in the reverse drive condition.

More specifically, such means operates to move the throttle 14 to said predetermined position in response to the operation of the reversing mechanism 36. This occurs regardless of the position of the throttle 14 before operation of the reversing mechanism 36. For example, if the throttle 14 is positioned to afford an engine speed above said predetermined speed, operation of the reversing mechanism 36 automatically moves or retards the throttle 14 to a position affording a decrease in engine speed to a point below said predetermined speed, and if the throttle 14 is positioned at an idling speed, operation of the reversing mechanism 36 automatically moves or advances the throttle 14 to a position affording an increase in engine speed to a point below said predetermined speed. The particular position to which the throttle 14 is moved can be an identical position for each case or, if desired, can be a different position. However, it is important that the throttle 14 is positioned to afford an engine speed below said predetermined speed so as to obtain disengagement of the centrifugal clutch 18, and thereby take the vehicle 10 out of forward drive condition.

In the illustrated embodiment, said means for controlling engine speed comprises a throttle control device or linkage including an inclined ramp 54 (see FIGURE 1) fixed to the vehicle 10 and an over-ride lever 56 pivotally connected to the inclined ramp 54 by any suitable pivot means 57. At one end, the over-ride lever 56 is pivotally connected to a throttle link 58, and at its other end, the lever 56 is formed with an upturned flange 60 including a guide slot 62. The throttle 14 is connected to the link 58 by means of a downwardly extending arm 64 connected to two oppositely acting springs 66 and 68. The springs 66 and 68 are, in turn, connected to the link 58 by any suitable means, and afford engine throttle setting adjustment.

Said throttle controlling device further includes a throttle control rod 74 slidably carried by a bracket 76 on the arm 46. The rod 74 carries a fixed cam plate 78 spaced from the lower end of the rod and disposed to cooperate with or engage the upturned flange 60 of the over-ride lever 56. To guide the path of travel of cam plate 78 along a defined path, namely, along the inclined ramp 54, the lower end of the rod 74 is received in the guide slot 62 of the over-ride lever 56. As can be noted ni FIGURES 1 and 4, when the throttle 14 is in an idle position, the over-ride lever 56 is slightly angularly related to the path of travel of the cam plate 78. As shown in FIGURE 5, when the engine 12 is operating above idle speeds, the throttle 14 can be positioned so that the over-ride lever is oppositely angularly related to the path of travel of the cam plate 78.

The rod 74 is angularly bent at 79 to afford, in response to clockwise movement of the arm 46 as seen from the left in FIGURE 1, engagement of the cam plate 78 with and along the inclined ramp 54 and to limit relative movement between the arm 46 and the rod 74 in one direction. At its other end, the rod 74 is connected to arm 46 by means of an over-ride spring 80 connected between the upper rod end and an upwardly extending bracket 81 on the arm 46. A collar 82 is adjustably carried on the rod 74 and is disposed to engage the bracket 76 to limit movement of the rod 74 relative to the arm in the other direction. The over-ride spring 80 biases the rod 76 in said other direction so as to normally hold the collar 82 tight against the bracket 76 and to afford movement of the rod 74 with the actuating arm 46. The spring 80 also serves as a component of a means for automatically disengaging the reversing mechanism 36 from the driving member 16.

Referring now to FIGURE 4, upon actuation of the reversing mechanism when the engine is operating around idle speed, as by movement of the actuator arm 46, the cam plate 78 moves along the inclined ramp 54 and a corner 83 of cam plate 78 contacts the upturned flange 60 of the over-ride lever 56 (as shown in solid lines in FIGURE 4) to thereby rotate the lever 56 to a predetermined position affording throttle advance and increase in engine speed to a predetermined speed which is below that speed necessary to engage the centrifugal clutch 18. When the engine is operating generally above idle speed or, more particularly, above said predetermined speed, the other corner 84 of the cam plate 78 contacts the upturned flange 60 of the lever 56 (as shown in FIGURE 5) to oppositely rotate the lever 56 to said predetermined position affording throttle retardment and decrease in engine speed to below said predetermined speed. This occurs regardless of the position of the accelerator pedal (not shown) because the lost motion spring 72 between the link 58 and the intermediate lever arm 70 affords independent movement of the throttle 14 relative to the intermediate arm 70. The lost motion spring 72 will correspondingly expand or contract depending upon the position of the accelerator pedal.

Said means for controlling engine speed also includes means for preventing further change in engine speed by holding the throttle 14 in said predetermined position during operation of the vehicle in a reverse drive condition. In the illustrated embodiment, said means includes, on the cam plate 78, a straight end portion 85 which abuts the upturned flange 60 of lever 56 (shown in phantom lines in FIGURE 4) to prevent further rotation of the lever 56 and thereby afford locking of the lever 56 in said predetermined position.

When the straight edge portion 85 of the cam plate 78 abuts the upturned flange 60 of the lever 56 further downward movement of the rod 74 is prevented while movement of the actuating arm 46 relative to the rod 74 against the biasing action of the over-travel spring 80 is permitted to afford engagement of the reversing mechanism 36. Thus, abutment of the cam plate 78 and lever 56 provides an anchor for the spring 80, and constitutes a part of the means for automatically disengaging the reversing mechanism 36. Since the over-travel spring 80 resists movement of the actuator arm 46 prior to and during engagement of the reversing mechanism 36, release of the actuator arm 46 will permit the spring 80 to automatically disengage the reversing mechanism 36, and thereby disengage the vehicle 10 from reverse drive condition.

The vehicle 10 is provided with an external and manually operable reversing lever 86 (see FIGURES 1 and 2) disposed to engage the actuating arm 46 to afford movement thereof to a position affording the reverse drive condition. The reversing lever 86 is pivotally connected to the vehicle 10 in a conventional manner and includes an end 88 engagable with a bushing 90 rotatably carried on the actuator arm 46 to avoid excessive wear to the arm 46. To maintain the vehicle in a reverse drive condition, the reversing lever 86 must be maintained or held against the biasing action of the over-ride spring 80 in the position shown by phantom lines in FIGURE 1.

Various of the features of the invention are set forth in the following claims.

What is claimed is:

1. The combination in a vehicle of an engine including a throttle, a first means for controlling said throttle, a driving member, a driven member, a reversing mechanism operatively connectable with said driven member and engageable with said driving member to afford a reverse drive condition, and means operative independently of said first means for controlling said throttle and connected to and operable in response to the operation of said reversing mechanism for over-riding said first means for controlling said throttle to control engine speed during operation of said vehicle in said reverse drive condition.

2. The combination in a vehicle of an engine including a driving member, a throttle, a first means for controlling said throttle, a driving member, a driven member, a reversing mechanism selectively engageable with said driving member and operably connectable with said driven member during engagement of said reversing mechanism with said driven member to afford a reverse drive condition, and means operable independently of said first means for controlling said throttle and connected to and operable in response to the operation of said reversing mechanism for controlling engine speed during operation of said vehicle in said reverse drive condition.

3. The combination in a vehicle of an engine including a throttle, a first means for controlling said throttle, a driving member, a driven member, a reversing mechanism selectively engageable with said driving member and operatively connectable with said driven member in response to engagement of said reversing mechanism with said driving member to afford a reverse drive condition, and means operable independently of said first means for controlling said throttle and connected to said reversing mechanism for over-riding said first means for controlling said throttle to advance engine speed in response to operation of said reversing mechanism.

4. The combination in a vehicle of an engine including a throttle, a first means for controlling said throttle, a driving member, a driven member, a reversing mechanism selectively engageable with said driving member and operatively connectable with said driven member in response to engagement of said reversing mechanism with said driving member to afford a reverse drive condition, and means operable independently of said first means for controlling said throttle and connected to and operable in response to operation of said reversing mechanism for over-riding said first means for controlling said throttle to advance engine speed upon operation of said reversing mechanism and to prevent engine speed advancement above a predetermined speed during operation in reverse drive condition.

5. The combination in a vehicle of an engine including a driving member and a throttle, first means for controlling said throttle, a driven member, a reversing mechanism selectively engageable with said driving member and operatively connectable with said driven member in response to engagement of said reversing mechanism with said driving member to afford a reverse drive condition, and means operable independently of said first means for controlling said throttle and connected to and operable in response to the operation of said reversing mechanism for over-riding said first means for controlling said throttle to adjust said engine throttle to a predetermined position and to hold said engine throttle in said predetermined position during operation of said vehicle in said reverse drive condition.

6. The combination in a vehicle of an engine including a driving member and a throttle, first means for controlling said throttle, a driven member, a reversing mechanism selectively engageable with said driving member and operatively connected with said driven member in response to engagement of said reversing mechanism with said driving member to afford a reverse drive condition, and means operable independently of said first means for controlling said throttle and connected to and operable upon operation of said reversing mechanism for over-riding said first means for controlling said throttle to move said throttle to a position affording a predetermined engine speed when said engine is operating below said predetermined speed, and to move said throttle to said position when said engine is operating above said predetermined speed, and to maintain said throttle in said position during operation of said vehicle in said reverse drive condition.

7. A vehicle comprising a prime mover having an output shaft, a drive train including a centrifugal clutch operatively connected to said prime mover and adapted to propel the vehicle forwardly upon rotation of said output shaft above a predetermined speed, said centrifugal clutch including a member fixed to said output shaft and rotatably driven by said prime mover, a reversing mechanism including a rotatable member selectively engageable with said clutch member, said reversing mechanism being operatively connected to said drive train in response to the operation of said reversing mechanism to propel the vehicle rearwardly when said prime mover is rotating below said predetermined speed, and means for automatically controlling prime mover speed when said reversing mechanism is operatively connected to said drive train.

8. A vehicle comprising an engine, a drive train including a centrifugal clutch operatively connected to said engine and adapted to propel the vehicle forwardly upon rotation of said engine above a predetermined speed, said centrifugal clutch including a member rotatably driven by said engine, a reversing mechanism including a rotatable member selectively engageable with said clutch member, said reversing mechanism being operatively connected to said drive train in response to the operation of said reversing mechanism to propel the vehicle rearwardly when said engine is rotating below said predetermined speed, and means for automatically controlling engine speed when said reversing mechanism is operatively connected to said drive train, and wherein said engine includes a throttle and said engine speed controlling means includes a linkage connected to said reversing mechanism, said linkage being operable in response to the operation of said reversing mechanism to move said throttle to, and to hold said throttle at, a predetermined position affording an engine speed below said predetermined speed.

9. A vehicle comprising an engine provided with a throttle for controlling engine speed, a drive train including a driving member and a centrifugal clutch means connected to said driving member to provide a forward drive condition upon rotation of said engine above a predetermined speed, said centrifugal clutch means including a member connected to said driving member, a manually operable reversing mechanism including a reversing rotor disposed for selective frictional engagement with said member, means operatively connecting said reversing mechanism to said drive train during operation of said reversing mechanism to afford a reverse drive condition of said drive train, and engine speed control means operable in response to the operation of said reversing mechanism for locating said throttle in a position affording an engine speed at a point below said predetermined speed and for maintaining said throttle in said position.

10. The combination in a vehicle of an engine including a driving member, a driven member, a reversing mechanism selectively engageable with said driving member and operatively connectable with said driven member during operation of said reversing mechanism to afford a reverse drive condition, a throttle for controlling engine speed, and a throttle control device comprising an over-ride lever pivotally carried on said vehicle and connected to said throttle, said over-ride lever being operative to move said throttle upon pivotal movement of said lever in one direction to afford increase in engine speed and upon pivotal movement of said lever in the other direction to afford decrease in engine speed, a rod connected to said reversing mechanism and including a cam plate disposed to rotate said lever in said one direction to a predetermined position affording engine speed advancement to a predetermined speed in response to operation of said reversing mechanism when said engine is operating below said predetermined speed and disposed to rotate said lever in said other direction to said predetermined position to retard engine speed to said predetermined speed in response to operation of said reversing mechanism when said engine is operating above said predetermined speed, and means for preventing movement of said throttle from said predetermined position.

11. A combination in accordance with claim 10 wherein said means for preventing movement of said throttle includes an upturned flange on said lever, and a straight end portion on said cam plate disposed for abutting engagement with said upturned flange to afford locking of said cam plate against said lever to prevent further movement of said lever.

12. A combination in accordance with claim 11 including an accelerator pedal, and means connecting said pedal to said throttle, said means including a lost motion spring disposed to permit movement of said pedal without affecting the position of said throttle when said over-ride lever is abutted by said cam plate.

13. A combination as set forth in claim 11 including an over-ride spring connected between said reversing mechanism and said rod, said spring being disposed to bias said reversing mechanism in a direction affording disengagement of said reversing mechanism in response to abutment of said cam plate against said over-ride lever.

14. A vehicle comprising an engine, a drive train including a centrifugal clutch operatively connected to said engine and adapted to afford a forward drive condition upon rotation of said engine above a predetermined speed, said centrifugal clutch including a member fixed to and rotatably driven by said engine, and a reversing mechanism including a rotatable member selectively engageable with said clutch member, said reversing mechanism being operatively connected to said drive train during operation of said reversing mechanism to afford a reverse drive condition when said engine is rotating below said predetermined speed.

15. The combination in a vehicle of an engine including a driving member, a driven member, means including clutch means for affording operative connection between said driving and driven members upon rotation of said engine above a predetermined speed to propel the vehicle forwardly, and a reversing mechanism including a rotatable member engageable with said driving member and normally in non-driving connection to said driven member, and belt means normally in a non-driving connection to said driving member and said driven member for affording driving connection of said rotatable member with said driven member upon engagement of said rotatable member with said driving member to thereby propel the vehicle rearwardly.

16. A combination in accordance with claim 15 including means for automatically disengaging said reversing mechanism from said driving member, said means including a spring biasing said reversing mechanism to a position affording disengagement of said rotatable member from said driving member.

17. The combination in a vehicle of an engine including a driving member, a driven member, means including clutch means for affording operative connection between said driving and driven members upon rotation of said engine above a predetermined speed to propel the vehicle forwardly, and a reversing mechanism including a rotatable member engageable with said driving member and normally in non-driving connection to said driven member, and means for affording driving connection of said rotatable member with said driven member upon engagement of said rotatable member with said driving member to thereby propel the vehicle rearwardly, and wherein said clutch eans includes a housing rotatably carried on said driving member and said rotatable member is selectively engageable with said housing.

18. A combination in a vehicle of an engine having a driving member, clutch means including a housing carried on said driving member, said clutch means affording driving connection with said driving member upon rotation of said driving member above a predetermined speed, a driven member carrying first and second pulleys, a driving belt connecting said first pulley and said clutch means to afford a forward drive condition of said vehicle upon rotation of said engine above said predetermined speed, a reversing mechanism including a shaft, a rubber drive wheel including a pulley rotatably mounted on said shaft, a bracket carrying said shaft, said bracket being disposed to afford selective movable and engagement of said drive wheel with said clutch housing, an actuating arm pivotally mounted on said vehicle and carrying said bracket to afford movement of said bracket to a position affording engagement of said drive wheel with said clutch housing, a transmission belt loosely carried on said reversing mechanism pulley and said second pulley, said transmission belt affording driving connection between said reversing mechanism pulley and said second pulley in response to engagement of said drive wheel with said housing, an overtravel spring carried on said actuating arm, and a rod slidably carried on said arm and disposed to contact a portion of said vehicle to limit movement of said rod, said rod being connected to said spring to provide movement of said rod with said arm until said rod contacts said vehicle portion whereupon said arm moves relative to said rod and against the biasing action of said spring.

19. The combination in a vehicle of an engine having a driving member, clutch means including a housing carried on said driving member, said clutch means affording driving connection with said driving member upon rotation of said engine above a predetermined speed, a driven member carrying first and second pulleys, a driving belt connecting said first pulley and said clutch means to afford a forward drive condition of said vehicle upon rotation of said engine above said predetermined speed, a reversing mechanism including a bracket swingably mounted on said vehicle and including a projecting part, a pulley and drive wheel rotatably mounted on said bracket and movable to afford selective engagement of said drive wheel with said clutch housing in response to swinging of said bracket, a transmission belt loosely carried on said reversing mechanism pulley and said second pulley, said transmission belt affording driving connection between said reversing mechanism pulley and said second pulley in response to engagement of said drive wheel with said housing, an engine throttle, an inclined ramp fixed to said vehicle, an over-ride lever being formed with an upturned flange including a guide slot therein, a rod slidably carried on said actuator arm bracket and extending through said guide slot, said rod including a cam plate disposed to travel on a path along said inclined ramp and to abut said upturned flange of said lever, whereby when said cam plate is abutting said upturned flange, said throttle is locked in a predetermined position, a collar on said rod disposed to engage said actuator arm bracket to prevent rod movement in one direction, a spring connected between said rod and said actuator arm for biasing said rod in said one direction so as to hold said collar against said bracket and afford movement of said rod with said actuator arm, said actuator arm being movable relative to said rod and against the biasing action of said spring upon abutment of said cam plate with said lever to afford engagement of said drive wheel with said clutch housing, said lever being slightly angularly related to the path of travel of said cam plate when said engine is operating generally at idle speed, whereupon operation of said reversing mechanism moves said cam plate along said ramp to thereby engage said upturned flange and rotate said lever to a predetermined position affording throttle advance and increase in engine speed to below said predetermined speed, and said lever being oppositely angularly related to the path of travel of said cam plate when said engine is operating generally above said predetermined speed, whereupon actuation of said reversing mechanism moves said cam plate along said ramp to thereby engage said upturned flange and rotate said lever in the other direction affording throttle retardment and decrease in engine speed to below said predetermined speed.

References Cited

UNITED STATES PATENTS

| 2,729,299 | 1/1956 | Rink | 180—70 X |
| 2,878,690 | 3/1959 | Capron et al. | 180—70 X |
| 3,044,568 | 7/1962 | Bookman | 180—70 |
| 3,108,481 | 10/1963 | Westmont | 180—70 X |
| 3,272,030 | 9/1966 | Blozis | 74—472 |

A. HARRY LEVY, *Primary Examiner.*